Patented Aug. 8, 1933

1,921,364

UNITED STATES PATENT OFFICE 1,921,364

MEDIA FOR PROTECTING FURS, HAIRS, FEATHERS, AND ANIMAL TEXTILE PRODUCTS AGAINST THE ATTACK OF ANIMAL AND PLANT PESTS

Wilhelm Lommel and Heinrich Münzel, Wiesdorf-on-the-Rhine, Germany, assignors to I. G. Farbenindustrie Aktiengesellschaft, Frankfort-on-the-Main, Germany, a Corporation of Germany No Drawing. Application May 17, 1929, Serial No. 363,999, and in Germany May 21, 1928

11 Claims. (Cl. 167—37)

The present invention relates to media capable of protecting fur, hair, feathers and animal textile products against the attack of animal and plant pests.

We have found that fur, hair, feathers, animal textile products and the like can be protected against the attack of animal and plant pests, such as moths, attagenus japonicus, certain species of bacteria, mold fungi and the like, by incorporating therewith a salt of a quaternary phosphonium base.

Such salts can be prepared, for example, by the addition of halogenated hydrocarbons to phosphines as described in Ann. der Chemie 207 page 193; 229 pages 309, 318. Hydrohalic acid salts of the quaternary phosphonium bases are thus obtained, which can easily be converted into other salts according to known methods, for example, by double decomposition with other suitable salts or acids, or by first manufacturing from the hydrohalic acid salts the corresponding free bases and then reacting upon the latter with a suitable acid, such as sulfuric acid, nitric acid, organic sulfinic- or sulfonic acids, carboxylic acids or the like. Also such acids as per se exert a moth repelling, bactericidal or fungicidal action, such as hydrofluoric acid, halogenated phenol o-carboxylic acids and other ones may be used with advantage.

In this or a similar way we have prepared and tested a large number of salts of phosphonium bases, partly containing several phosphorous atoms in the molecule, such as ethylene-di-(triphenylphosphoniumbromide), p-xylylene-di-(triphenylphosphoniumbromide), pentamethylene-di-(triphenylphosphoniumbromide) and the like, partly corresponding to the probable general formula

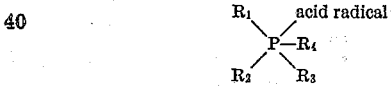

wherein $R_1$—$R_4$ represent similar or dissimilar monovalent hydrocarbon radicals which may be substituted for instance by halogen atoms, nitro-, hydroxy-, alkoxy groups or the like.

Compounds we have tested are for instance: Tetraethylphosphoniumiodide, tetraphenylphosphoniumbromide, tetraisobutylphosphoniumsulfate, benzyl-triethylphosphoniumchloride, naphthyl-triethylphosphoniumchloride, naphthyl-triethylphosphoniumiodide, p-chlorobenzyl-triphenylphosphoniumchloride, ethyl-tritolylphosphoniumiodide, ethyl-trixylylphosphoniumiodide, benzyl-triphenylphosphoniumnitrate, methyl-triphenylphosphoniumiodide, ethyl-triphenylphosphoniumbromide, hydroxyethyl-triphenylphosphoniumchloride, o-chlorobenzyl-triphenylphosphoniumchloride, p-nitrobenzyl-triphenylphosphoniumchloride,

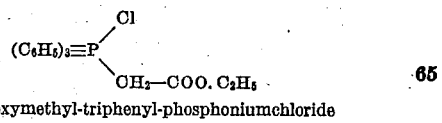

carbethoxymethyl-triphenyl-phosphoniumchloride

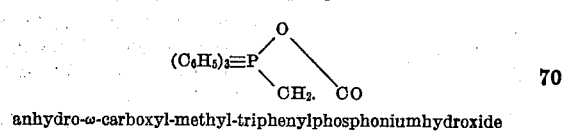

anhydro-ω-carboxyl-methyl-triphenylphosphoniumhydroxide allyl-triphenylphosphoniumchloride, the 1-naphthol-5.7-disulfonic acid-, or salicylic acid- or thiocyanic acid salt of benzyl-triphenylphosphonium, the α-naphthalene sulfonic acid salt of chloro-benzyl-triphenylphosphonium and the like.

All these salts and still other ones have been found efficacious in combating moths or other animal or plant pests, many of them to such a high degree, that solutions of them of less than 0.1%—0.2% strength are sufficient to render the materials mentioned above moth proofed. Also the growth of bacteria and mold fungi upon these materials is inhibited to a far reaching extent.

It may expressly be stated that from our experiments it must be concluded, that not only the compounds specifically mentioned above are efficacious in the above sense, but that this property is, to all salts of quaternary phosphonium bases.

The incorporating of our compounds with the materials to be protected may be performed in the most various manners. For instance, the salts may be dissolved in water or a suitable organic solvent, such as alcohol, chloroform or the like and the materials may be dipped into or sprayed with these solutions. In many cases also the solid salts may be used in a finely powdered form with or without the addition of suitable carriers or diluents, such as kieselguhr, talc, wood meal or the like and the treatment of the materials to be protected may be performed by rolling the latter with the powders in an appropriate apparatus. Furthermore the formation of certain salts of the quaternary phosphonium bases may be performed upon the material to be protected, for example, by impregnating it with a salt of the bases and after-treating it with a solution of a suitable organic or inorganic salt or acid or vice versa, whereby it will be possible to form difficultly soluble or nearly insoluble salts of our bases on the materials to be protected.

It may be mentioned that in all these cases an interaction between the material to be protected and the protecting agent takes place, whereby it is not certain, whether this interaction is of a chemical or physico-chemical nature. This may be proved by the fact that solutions of our compounds are exhausted by the materials being treated with the solutions. Also in the case of the dry application of our compounds an interaction takes place, probably due to the moisture which always adheres to the materials to be protected.

The following examples illustrate our invention, without limiting it thereto:—

*Example 1.*—100 kg. of wool are immersed into an aqueous or alcoholic solution of benzyl-triphenylphosphoniumchloride of 0.3% strength. After the wool is completely wetted, it is pressed off and dried. The wool thus treated is completely moth proofed and furthermore protected to a far reaching extent against the attack of animal and plant pests, such as attagenus japonicus, mold fungi and the like.

*Example 2.*—Wool treated with a solution of benzyl-triphenylphosphoniumchloride as described in Example 1, is aftertreated with an aqueous solution of potassium perchlorate, whereby the nearly insoluble perchlorate of benzyl-triphenylphosphonium is formed upon the fibre. The wool thus treated is moth proofed.

*Example 3.*—Wool is impregnated with an aqueous solution of naphthalene-α-sulfonic acid, pressed off and aftertreated with an aqueous 0.2% solution of benzyl-triphenylphosphonium-sulfate. The naphthalene-α-sulfonic acid salt of benzyl-triphenylphosphonium is thus formed upon the fibre rendering it moth proofed.

*Example 4.*—Wool, fur or the like is sprayed with an aqueous or alcoholic solution of benzyl-triethylphosphoniumchloride of 2% strength. The materials thus treated are moth proofed.

*Example 5.*—Hair or fur is rolled in a drum with a mixture consisting of 90% of talc and 10% of p-chloro-benzyl-triphenylphosphoniumchloride for about 1 hour, whereby they are rendered moth proof.

We claim:—

1. As products capable of protecting hair, furs, feathers and animal textile products against attack by animal and plant pests, the salts of quaternary phosphonium bases.

2. As products capable of protecting hair, fur, feathers and animal textile products against attack by animal and plant pests, the products of the probable general formula

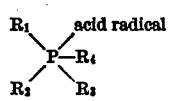

wherein $R_1$, $R_2$, $R_3$ and $R_4$ mean monovalent hydrocarbon radicals which may be substituted.

3. As products capable of protecting hair, fur, feathers and animal textile products against attack by animal and plant pests, the products of the probable general formula

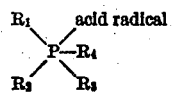

wherein $R_1$, $R_2$ and $R_3$ mean an aryl radical which may be substituted by halogen atoms and $R_4$ stands for a monovalent substituted or unsubstituted hydrocarbon radical.

4. As products capable of protecting hair, fur, feathers and animal textile products against attack by animal and plant pests the products of the probable formula

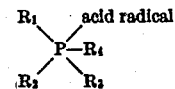

wherein $R_1$, $R_2$ and $R_3$ mean an aryl radical which may be substituted by halogen atoms, and $R_4$ means a substituted or unsubstituted aralkyl radical.

5. As products capable of protecting hair, fur, feathers and animal textile products against attack by animal and plant pests, the products of the probable formula

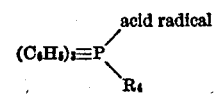

wherein $R_4$ means an aralkyl radical which may be substituted by halogen atoms.

6. As products capable of protecting hair, fur, feathers and animal textile products against attack by animal and plant pests, the compounds of the probable formula

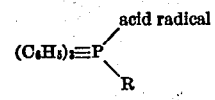

wherein R means the benzyl radical which may be substituted by halogen atoms.

7. As a product capable of protecting hair, fur, feathers and animal textile products against attack by animal and plant pests, benzyl-triphenyl-phosphoniumchloride.

8. As new products, salts of quaternary phosphonium bases of the general formula:

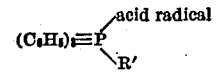

wherein R' stands for a benzyl radical which contains chlorine atom substituents, said products being capable of protecting hair, fur, feathers and animal textile products against attack by animal and plant pests, when said animal products are treated therewith.

9. As a new product capable of protecting hair, fur, feathers and animal textile products against attack by animal and plant pests, para-chloro-benzyl-triphenylphosphonium-chloride of the following formula:

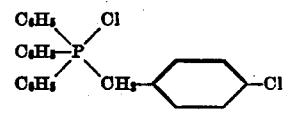

10. As a new product capable of protecting hair, fur, feathers and animal textile products against attack by animal and plant pests, ortho-chloro-benzyl-triphenylphosphonium-chloride of the following formula:

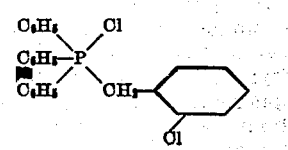

11. As products, capable of protecting hair, fur, feathers and animal textile products against attacks by animal and plant pests, a benzyl-triphenylphosphonium chloride of the following formula:
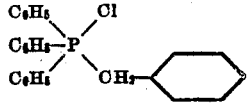
in which at least one hydrogen atom of the aromatic nucleus of the benzyl radicle is replaced by chlorine.
WILHELM LOMMEL. [L. S.]
HEINRICH MÜNZEL. [L. S.]